(12) United States Patent
Moraru et al.

(10) Patent No.: US 10,462,218 B1
(45) Date of Patent: Oct. 29, 2019

(54) SYSTEM AND METHOD FOR SENDING PROPOSALS WITHIN A DISTRIBUTED STATE MACHINE REPLICATION SYSTEM

(71) Applicant: Google LLC, Mountain View, CA (US)

(72) Inventors: Iulian Moraru, San Jose, CA (US); Brian Frank Cooper, San Jose, CA (US); Sebastian Kanthak, San Jose, CA (US); Alexander Lloyd, New York, NY (US); Mert Akdere, Mountain View, CA (US)

(73) Assignee: Google LLC, Mountain View, CA (US)

( * ) Notice: Subject to any disclaimer, the term of this patent is extended or adjusted under 35 U.S.C. 154(b) by 48 days.

(21) Appl. No.: 14/799,891

(22) Filed: Jul. 15, 2015

(51) Int. Cl.
*H04L 29/08* (2006.01)
*H04L 29/06* (2006.01)
*H04W 28/06* (2009.01)

(52) U.S. Cl.
CPC ............ *H04L 67/108* (2013.01); *H04L 67/40* (2013.01); *H04L 69/324* (2013.01); *H04W 28/065* (2013.01)

(58) Field of Classification Search
CPC ..... H04L 67/108; H04L 67/40; H04L 69/324; H04L 67/1095; H04W 28/065; G06F 17/30578; G06F 17/30362; G06F 17/30377; G06F 17/30575
See application file for complete search history.

(56) References Cited

U.S. PATENT DOCUMENTS

| 5,790,676 | A | 8/1998 | Ganesan et al. |
| 7,023,848 | B2 | 4/2006 | Yehuda et al. |
| 7,298,746 | B1 | 11/2007 | De La Iglesia et al. |
| 7,447,234 | B2 | 11/2008 | Colas et al. |
| 7,620,680 | B1 * | 11/2009 | Lamport ............. H04L 63/1441 709/201 |
| 8,276,035 | B1 | 9/2012 | Savarese et al. |
| 8,412,856 | B2 | 4/2013 | Thaler |
| 8,751,598 | B1 * | 6/2014 | Shankar ............. H04L 67/1095 707/613 |
| 9,230,000 | B1 * | 1/2016 | Hsieh ................ G06F 17/30575 |

(Continued)

OTHER PUBLICATIONS

Stevens, Richard et al TCP/IP Illustrated, vol. 1 Addison Wesley 1994. Appropriate sections uploaded.*

(Continued)

*Primary Examiner* — Jeffrey M Rutkowski
*Assistant Examiner* — Basil Ma
(74) *Attorney, Agent, or Firm* — Lerner, David, Littenberg, Krumholz & Mentlik, LLP

(57) ABSTRACT

Systems and methods are provided for efficiently sending large units of data in a network. A sender computing device splits the proposal into a plurality of fragments, and sends each of the plurality of fragments to a receiver computing device. The sender computing device receives an acknowledgement from the receiver computing device for each fragment received by the receiver computing device. If no acknowledgements for any fragments are received within a predetermined time period, it may be determined that an error occurred, in which case the sender may time out or take another action. The sender computing device further sends a message to the receiver computing device, wherein a payload of the message includes one or more references corresponding to the plurality of fragments sent.

18 Claims, 6 Drawing Sheets

(56) References Cited

U.S. PATENT DOCUMENTS

| | | | | |
|---|---|---|---|---|
| 2010/0180116 | A1* | 7/2010 | Coan | H04L 9/0891 713/168 |
| 2012/0130950 | A1* | 5/2012 | Jain | G06F 17/30212 707/634 |
| 2012/0233228 | A1 | 9/2012 | Barton et al. | |
| 2012/0254319 | A1 | 10/2012 | Wheeler | |
| 2012/0254412 | A1* | 10/2012 | Goose | G06F 9/5072 709/224 |
| 2014/0304357 | A1* | 10/2014 | Bestler | G06F 17/30 709/213 |
| 2015/0242481 | A1* | 8/2015 | Hasegawa | G06F 17/30 707/623 |
| 2015/0278244 | A1* | 10/2015 | Shvachko | G06F 17/30174 707/634 |
| 2015/0341151 | A1* | 11/2015 | Sun | H04K 1/08 370/329 |

OTHER PUBLICATIONS

Rao et al. Using Paxos to Build a Scalable, Consistent and Hightly Available Datastore. Proceedings ofthe VLDB Aug. 29-Sep. 3, 2011.*

Ousterhout and Ongaro. Implementing Replicated Logs with Paxos. Mar. 1, 2013. From http://ramcloud.stanford.edu/~ongaro/userstudy.*

Konczak et al. JPaxos: State Machine Replication based on the Paxos Protocol. EPFL-Report-167765. Jul. 31, 2011.*

Lamport, Leslie Nov. 1, 2001. Paxos Made Simple.*

Kozierok, Charles TCP/IP Guide Oct. 4, 2005 Publisher: No Starch Press Chapter 49 TCP Reliability and Flow Control Featuers.*

Corbett et al. "Spanner: Google's Globally-Distributed Database" Proceedings of OSDI 2012 (Year: 2012).*

Cho et al "Surviving congestion in geo-distributed storage systems" Usenix 2012 Jun. 13-15, 2012 (Year: 2012).*

Liebig et al., "A publish/subscribe CORBA Persistent State Service Prototype", downloaded Jun. 17, 2015.

Wechta et al., "The interaction of the TCP flow control procedure in end nodes on the proposed flow control mechanism for use in IEEE 802.3 switches", ResearchGate, Jan. 1998.

Druschel et al., "Fbufs: A High-Bandwidth Cross-Domain Transfer Facility", downloaded Jun. 17, 2015.

Low et al., "Optimization Flow Control-I: Basic Algorithm and Convergence", IEEE/ACM Transactions on Networking, vol. 7, No. 6, Dec. 1999.

Borman et al., "IPv6 Jumbograms", Standards Track, Network Working Group, Aug. 1999.

Rhee et al., "TEAR: TCP emulation at receivers—flow control for multimedia streaming", Apr. 28, 2000.

* cited by examiner

| Fragment Sent (Proposal ID; Seq #) | Time Sent | ACK Received (ACK ID) | Time Received |
|---|---|---|---|
| xx; 1 | 2:01:01 | w | 2:01:09 |
| xx; 2 | 2:01:05 | | |
| xx; 3 | 2:01:10 | y | 2:02:00 |
| xx; 4 | 2:01:18 | z | 2:01:30 |

Fig. 4

SYSTEM AND METHOD FOR SENDING PROPOSALS WITHIN A DISTRIBUTED STATE MACHINE REPLICATION SYSTEM

BACKGROUND

Standard implementations of the Paxos state machine replication protocol, or of other state machine replication protocols, require "proposals" for how the replicated state should be changed to be sent and accepted as an indivisible unit. The proposals can include, for example, data to be written. This can make it difficult to implement the replication protocol in a wide area, since larger proposals may take a long time to transmit over low-bandwidth links, especially in the case of congestion or failures. In order to ensure liveness of the replication protocol, it is necessary to timeout a proposal transfer when it is not making progress. However, large proposals making slow progress can also timeout, preventing the proposal from being committed. In some instances, a leader elected to send proposals may lose leadership if it is having trouble transmitting proposals. Accordingly, large proposals can cause the replication system to be leaderless for indefinite periods, preventing any progress.

SUMMARY

Large proposals may be split into multiple proposal fragments that can be transferred individually. These fragments may be treated specially to ensure both correctness and liveness. For example, Paxos ordering guarantees may be preserved, despite out-of-order and out-of-band transmission of fragments. As another example, an indication that a sender device is making progress is provided even before the whole proposal is received and acknowledged. Additionally, quality of service (QoS) of a path and network used to transmit the data contained in the large proposal may be varied, while still verifying correctness.

Aspects of the disclosure provide a method of sending a proposal, the proposal including a unit of data to be written. The method includes splitting, with one or more processors, the proposal into a plurality of fragments, sending each of the plurality of fragments to a destination device, receiving an acknowledgement from the destination device for each fragment received by the destination device, and sending, with the one or more processors, a message to the destination device, wherein a payload of the message includes one or more references corresponding to one of the plurality of fragments sent. In some examples, the method further includes determining whether the acknowledgement for any fragment is received within a predetermined time period, and performing an action, such as timing out or relinquishing leadership responsibilities, if the acknowledgement is not received with the predetermined time period.

Another aspect of the disclosure provides method of receiving a proposal. This method includes receiving, with one or more processors, one or more fragments of the proposal, storing the received one or more fragments, sending, with the one or more processors, an acknowledgement for each received fragment, receiving, with the one or more processors, a message, wherein a payload of the message includes one or more references to each fragment of the proposal, and reconstructing, with the one or more processors, the proposal using the received one or more fragments.

Yet another aspect provides a system. The system includes a sender computing device, including a memory storing a proposal, and one or more processors in communication with the memory. The sender computing device may be configured to split the proposal into a plurality of fragments, send each of the plurality of fragments to a receiver computing device, receive an acknowledgement from the receiver computing device for each fragment received by the receiver computing device, and send a message to the receiver computing device, wherein a payload of the message includes one or more references corresponding to one of the plurality of fragments sent. The receiver computing device, which also includes a memory and one or more processors in communication with the memory, may be configured to receive one or more of the plurality of fragments of the proposal, store the received one or more fragments, send the acknowledgement to the sender computing device for each received fragment, receive the message, including the one or more references to each fragment of the proposal, from the sender computing device, and reconstruct the proposal using the received one or more fragments.

BRIEF DESCRIPTION OF THE DRAWINGS

FIG. 4 is an example table according to aspects of the disclosure.

DETAILED DESCRIPTION

Figure 1:
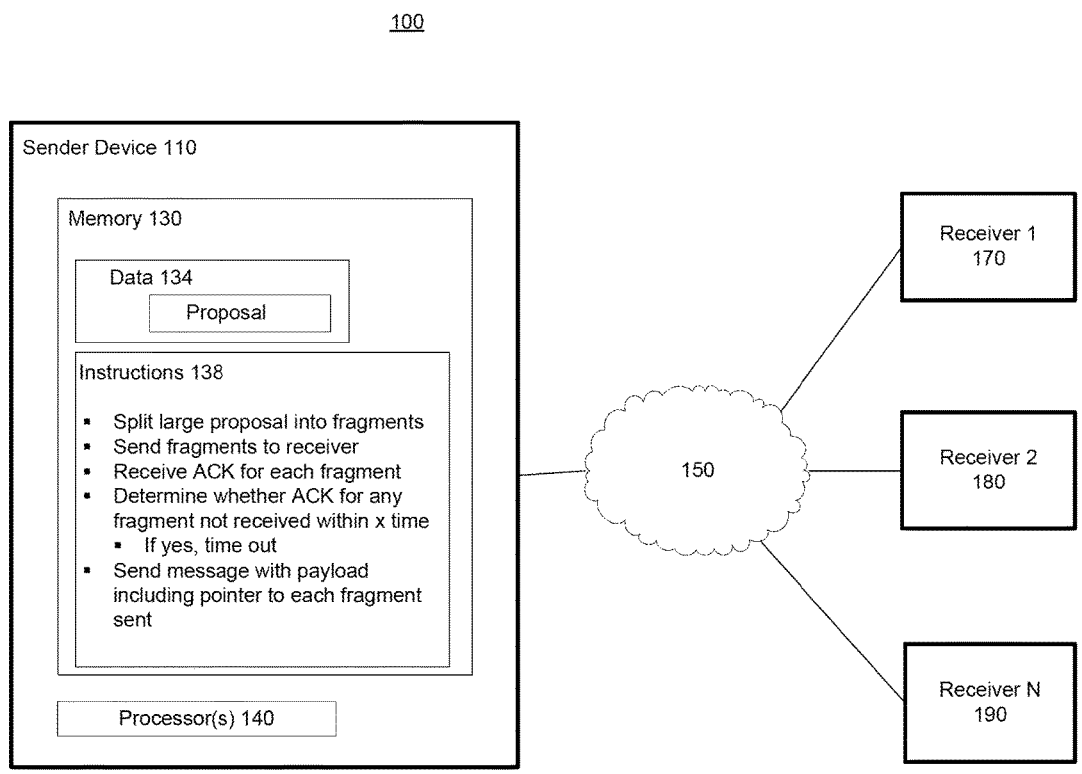
FIG. 1 is an example system diagram according to aspects of the disclosure.

Large proposals may be split into fragments, and each fragment may be sent separately from a sender device to a receiver device. For example, when a Paxos replica needs to make a remote procedure call (RPC) with a payload that contains a large Paxos proposal, the replica instead splits the proposal into fragments, and sends each fragment as a separate RPC. The receiver device stores these fragments, for example, in a map in internal or external memory. The sender device also sends a message including pointers to each of the transmitted fragments. For example, when an original RPC is issued, the sender revises the RPC by replacing the payload with a reference to the previously sent fragments. The receiver will then recompose the original payload and execute the original procedure call.

A sender device may check a size of a payload prior to sending to determine whether or not to split the proposal. For example, if the payload is larger than 10 MB, the sender will launch a sequence of smaller RPCs, each transferring a fragment of the payload. The sender will then issue another RPC, with a reference to this sequence of fragments. The receiver stores the sequence of fragments in a map in memory, indexed by one or more identifiers. Upon receiving the original RPC (which now references the sequence of fragments instead of encapsulating the payload), the receiver will recompose the original payload and execute the intended procedure.

The receiver device sends an acknowledgement to the sender device for each fragment received. The acknowledgement may include, for example, a fragment identifier and a sequence number. The sender device may keep track of these acknowledgements. For example, the sender device may periodically check if an acknowledgement for any fragment has been received. If no acknowledgements have been received within a predetermined time period, such as 10 seconds, the sender device may take an action such as canceling the sequence of fragments or relinquishing leadership.

When a message handler of the receiver first receives an RPC that is part of a sequence, such as a fragment or the revised RPC with a references to fragments instead of the payload, it creates an object to keep track of all the fragments it is about to receive. It places this object into a map indexed by an identifier of the sequence. If the message handler receives all the fragments before the revised RPC, it will reconstruct the payload from the fragments and process the revised RPC as it would usually process the original RPC. If the message handler receives the revised RPC before receiving all the fragments, it may reply with a request that the sender retry later, when perhaps all fragments have arrived.

The message handler may also periodically check whether more than a predetermined amount of time has passed since the last time a message was received for any active sequence. If so, it may discard the object created for the sequence. If fragments are redelivered, duplicates may be identified, for example, by fragment identifier or sequence identifier.

FIG. 1 illustrates an example system 100, in which a plurality of computing devices are communicatively coupled through network 150. The plurality of network devices may include servers or other computing devices, which may be capable of operating in one or more states. In this example, server 110 is elected to operate in a leader state, while servers 170-190 operate in a slave state. In this regard, sender server 110 provides updates and other information to receiver devices 170-190, for example, by sending proposals.

The network 150 may be a datacenter, a load-balanced server farm, or any other type of computing environment, including a backplane of interconnected peripherals or a system of components on a motherboard. The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing.

The sender server 110 may be any type of virtualized or non-virtualized computing device or system of computing devices capable of communicating over a network. Server 110 can contain one or more processors 140, memory 130 and other components typically present in general purpose computing devices. The memory 130 can store information accessible by the one or more processors 140, including instructions 138 that can be executed by the one or more processors 140.

Memory 130 can also include data 134 that can be retrieved, manipulated or stored by the processor 140. The memory can be of any non-transitory type capable of storing information accessible by the processor, such as a hard-drive, memory card, RAM, DVD, write-capable, etc.

The instructions 138 can be any set of instructions to be executed directly, such as machine code, or indirectly, such as scripts, by the one or more processors. In that regard, the terms "instructions," "applications," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 134 can be retrieved, stored or modified by the one or more processors 140 in accordance with the instructions 138. In one example, the data 134 may include one or more proposals to be provided to receiver devices 170-190. The proposals may have been received from another network device (not shown) and temporarily stored. Although the subject matter described herein is not limited by any particular data structure, the data can be stored in internal or external memory, computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 140 can be any conventional processors, such as commercially available CPUs. Alternatively, the processors can be dedicated components such as an application specific integrated circuit ("ASIC") or other hardware-based processor. Although not necessary, the server 130 may include specialized hardware components to perform specific computing processes.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Although only a few computing devices are depicted in FIG. 1, it should be appreciated that a typical system can include a large number of connected computing devices, with each different computing device being at a different node of the network 150. For example, the sender server 110 may be connected to a plurality of client computing devices through the network 150 or through another network (not shown). In serving requests from the client devices, the server 110 may send requests, such as RPCs, to the network device 180. Although certain advantages are obtained when information is transmitted or received as noted above, other aspects of the subject matter described herein are not limited to any particular manner of transmission of information.

The network devices 170-190 may be configured similarly to the server computing device 110. As an example, the receiver device 180 is described in further detail in connection with FIG. 2.

As mentioned above, the sender server 110 may send proposals to the network devices 170-190 through the network 150. The sender server 110 may determine, prior to sending a proposal, whether the proposal exceeds a predetermined size. For example, the sender server 110 may compare the proposal to a threshold, such as 10 MB. If the proposal exceeds the threshold, the sender server 110 may split the proposal into a number of fragments, and send the fragments individually to the network devices 170-190. For example, each fragment may be sent as a separate RPC. In some examples, each fragment RPC may include a proposal identifier (ID) and a sequence number. The sender server 110 may receive an acknowledgement from the receiver servers 170-190 for each fragment sent, and the sender may use the received acknowledgements to determine an action to take. For example, if the sender server does not receive an acknowledgement within a given time period, the sender server 110 may time out. The sender server 110 may also replace a payload of the original RPC with one or more pointers to each of the fragments, thereby creating a revised RPC, and send the revised RPC.

Figure 2:
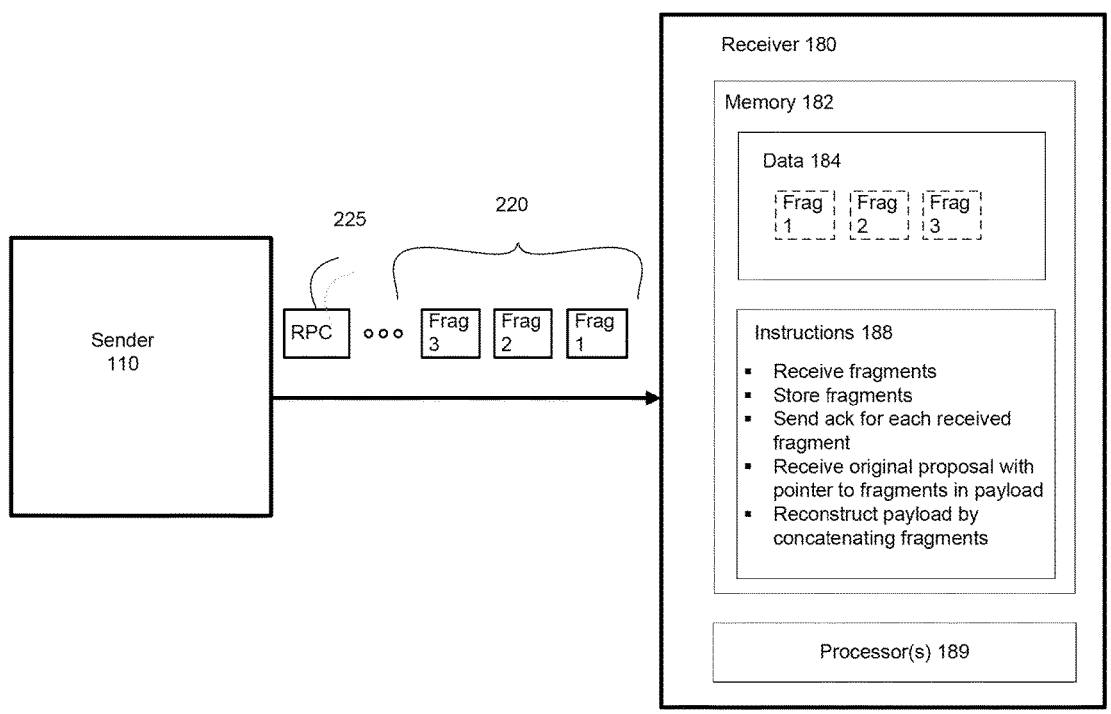
FIG. 2 is a block diagram illustrating an example data transmission according to aspects of the disclosure.

FIG. 2 provides further detail on a receiver side of the proposal. A receiver, such as receiver server 180, may be structured similarly to the sender server 110, with one or more processors 189 and memory 182, including data 184 and instructions 188 as described above. In some examples, the network device 180 may be a server or client computing device within a different computing infrastructure. For example, the network device 180 may be a network server connected to and serving one or more client computing devices, and the server 110 may be an application server serving a plurality of network servers. In some examples, the network device 180 may be a personal computing device having all of the components normally used in connection with a personal computing device, such as a central processing unit (CPU), memory (e.g., RAM and internal hard drives) storing data and instructions, a display (e.g., a monitor having a screen, a touch-screen, a projector, a television, or other device that is operable to display information), user input device (e.g., a mouse, keyboard, touch-screen or microphone), and all of the components used for connecting these elements to one another.

As shown in FIG. 2, the receiver server 180 receives fragments 220 of a proposal and a message 225 including pointers to the fragments 220 in place of its payload. The receiver device 180 stores the received fragments 220, for example, in data 184. For each fragment received, the receiver device 180 sends an acknowledgement to the sender device 110. The acknowledgement may include identifiers specific to the proposal, the fragment, and/or the acknowledgement. The acknowledgment may also include timing information, such as a time the corresponding fragment was received and a time the acknowledgement was sent. The receiver device 180 may also receive the message 225, including the pointers, and may use the message 225 to reconstruct the proposal. For example, the receiver device 180 may determine, based on the message 225, whether all fragments were received. In some examples, the message 225 may also provide an indication in which the fragments 220 should be concatenated to reconstruct the proposal.

Figure 3:
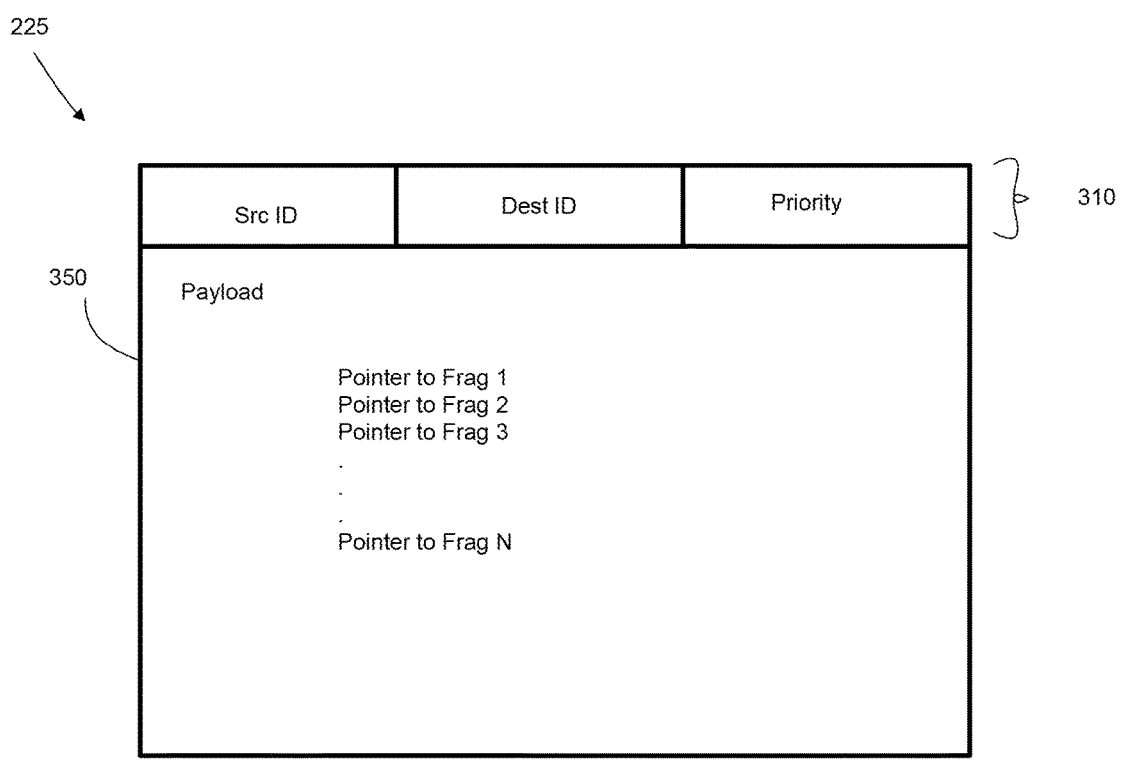
FIG. 3 illustrates an example message format according to aspects of the disclosure.

FIG. 3 illustrates an example of the message 225. The message 225 may be, for example, an RPC. Accordingly, the message may include header information 310, such as source identifier, destination identifier, and priority. The message 225 may further include a payload 350. When the message 225 is originally received by the sender server 110 for sending to the receiver devices 170-190, the message may include the entire proposal to be sent in the payload 350. However, the proposal may be replaced, for example by the sender server 110, with one or more references to each of the fragments 220 into which the original proposal was divided. In some examples, the reference may include the proposal identifier, and thus one reference could identify every fragment. For example, if each fragment is uniquely identified by the proposal ID, which effectively identifies the entire sequence of fragments, and the sequence number that represents its position in the sequence, the receiver device 180 could identify the fragments using only the proposal ID and reconstruct the proposal. In other examples, the one or more references in the payload may also include sequence numbers of the fragments, a total number of fragments, or other information related to the fragments. Moreover, multiple references may be included in the payload, for example, such that each reference corresponds to a particular fragment.

As mentioned above, the receiver device 180 may send an acknowledgement to the sender device for each fragment received. The sender may track the acknowledgments. FIG. 4 provides an example table which may be maintained by the sender device 110 tracking the acknowledgements. It should be understood that any other data structure, including various types of information, may be maintained by the sender device or other devices.

As seen in FIG. 4, table 400 includes a number of columns 410-440, listing identification information (e.g., proposal ID and sequence number) for the fragments sent, time the fragments were sent, information identifying the acknowledgement received, and time the acknowledgement was received. The table also includes rows 450-480. While only a few rows are shown in this example, it should be understood that the number of rows may correspond, for example, to the number of fragments sent, and thus any number of rows may be included.

In the example of FIG. 4, fragments 1-4 of proposal "xx" were sent by the sender device. While in this example the fragments were sent at various times within seconds of one another, the timing of sending the fragments may vary. For example, the fragments may be sent all at a same time, or the timing may be further spread out. Moreover, the timing between fragments may be consistent or may vary, for example, in relation to network capacity or size of the fragment.

Acknowledgements were only received for fragments 1, 3, and 4. If the acknowledgement for fragment 2 is not received within a predetermined time, the sender device may take an action, such as timing out, resending the fragment 2, or relinquishing its responsibilities to another device. In some examples, a leader lease for the sender device may be extended as long as an acknowledgment for any fragment is received within a given time period. For example, rather than comparing a current time to a time a particular fragment was sent, the sender device may periodically check if any acknowledgment was received. If a subsequent acknowledgement is not received within x seconds, for example, of a previous acknowledgement, then the sender may time out or take some other action.

The sending device may continue sending fragments without waiting for an acknowledgement from a previous fragment. For example, after sending the fragment 1, the sender device sent the fragment 2 before the acknowledgment for fragment 1 was received. The acknowledgments may also be received in a different order than the fragments were sent. For example, although the fragment 3 was sent before the fragment 4, the acknowledgment for fragment 4 was received before the acknowledgement for fragment 3.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
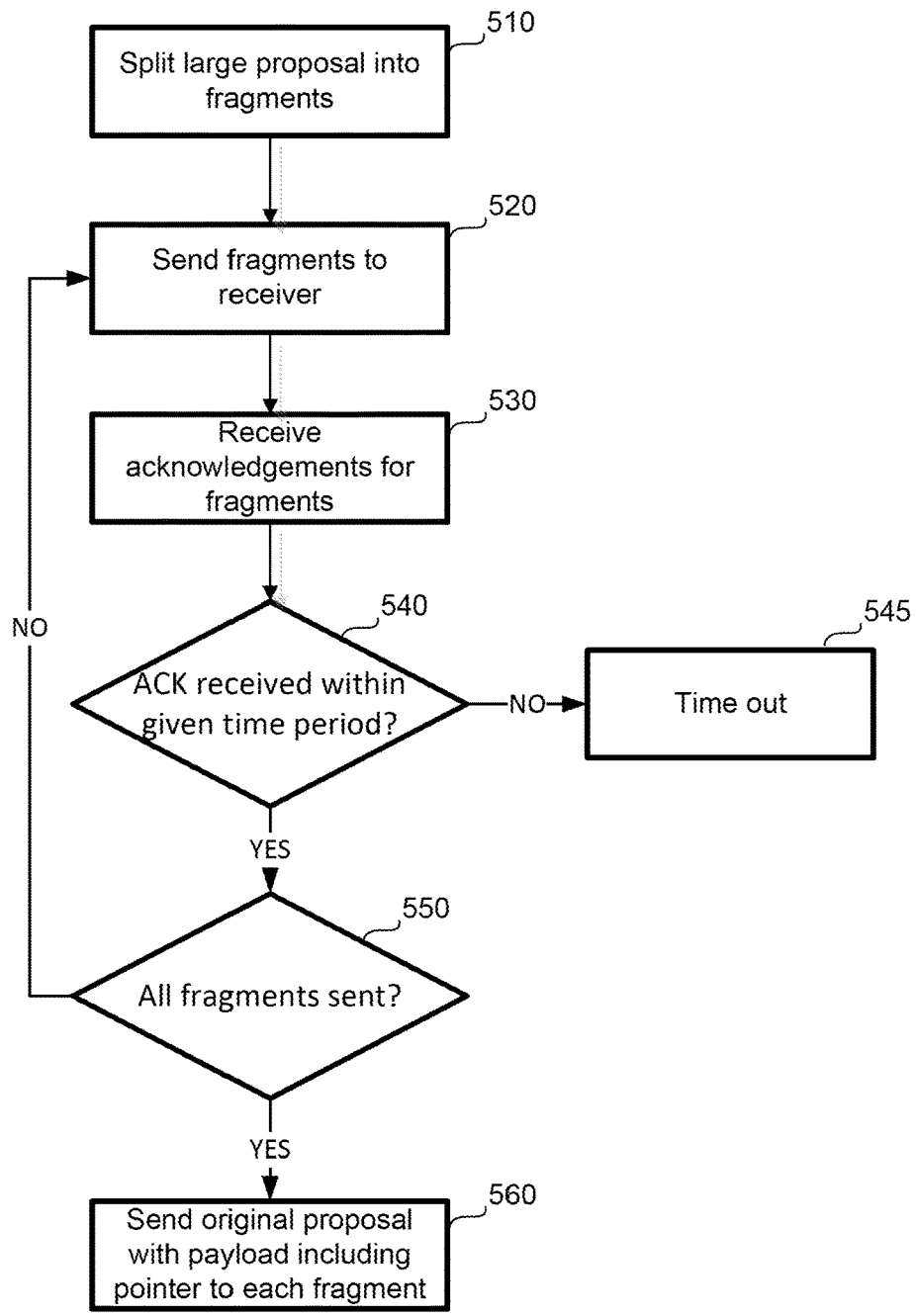
FIG. 5 is an example flow diagram illustrating a method according to aspects of the disclosure.

FIG. 5 illustrates an example method 500 of sending large proposals. The method 500 may be performed, for example, by a sender device, such as a leader server in a network. Upon receipt of a proposal for sending, the sender device may determine whether the proposal meets or exceeds a predetermined size.

If the proposal meets or exceeds the predetermined size, in block 510 the proposal is split into a number of fragments. For example, the sender may invoke an RPC for the original proposal and also invoke a number of fragment RPCs. According to some examples, the proposal may be split into a number of fragments of approximately equal size, wherein the number is based on the overall size of the proposal. In other examples, the splitting may be a logical division based on a content of the proposal. Further, it is possible that the sender device could dynamically adapt the fragment size based on how quickly fragments are received and acknowledged.

In block 520, the sender device sends each of the fragments to a receiver device, such as a slave server. Each fragment may be sent with one or more identifier, such as a unique identifier of the fragment sequence and a sequence number. In some examples, each fragment is sent as a separate RPC. However, other message formats are also possible.

In block 530, acknowledgements are received for the fragments. The acknowledgments may also include identifiers and other information, for example, identifying the fragment to which they correspond. In this regard, the sender device may track the fragments sent and corresponding acknowledgements received. If the sender device determines that an acknowledgement was not received within a given time period (block 540), the sender may time out (block 545) or take some other action. Otherwise, the sender may continue sending fragments until it determines (block 550) that all fragments have been sent.

In block 560, the sender replaces a payload of the original proposal with references to each of the fragments, and sends the original proposal. While in this example the sender only sends the original proposal with references once all fragments are sent, the order of sending fragments and the original proposal may be modified.

Figure 6:
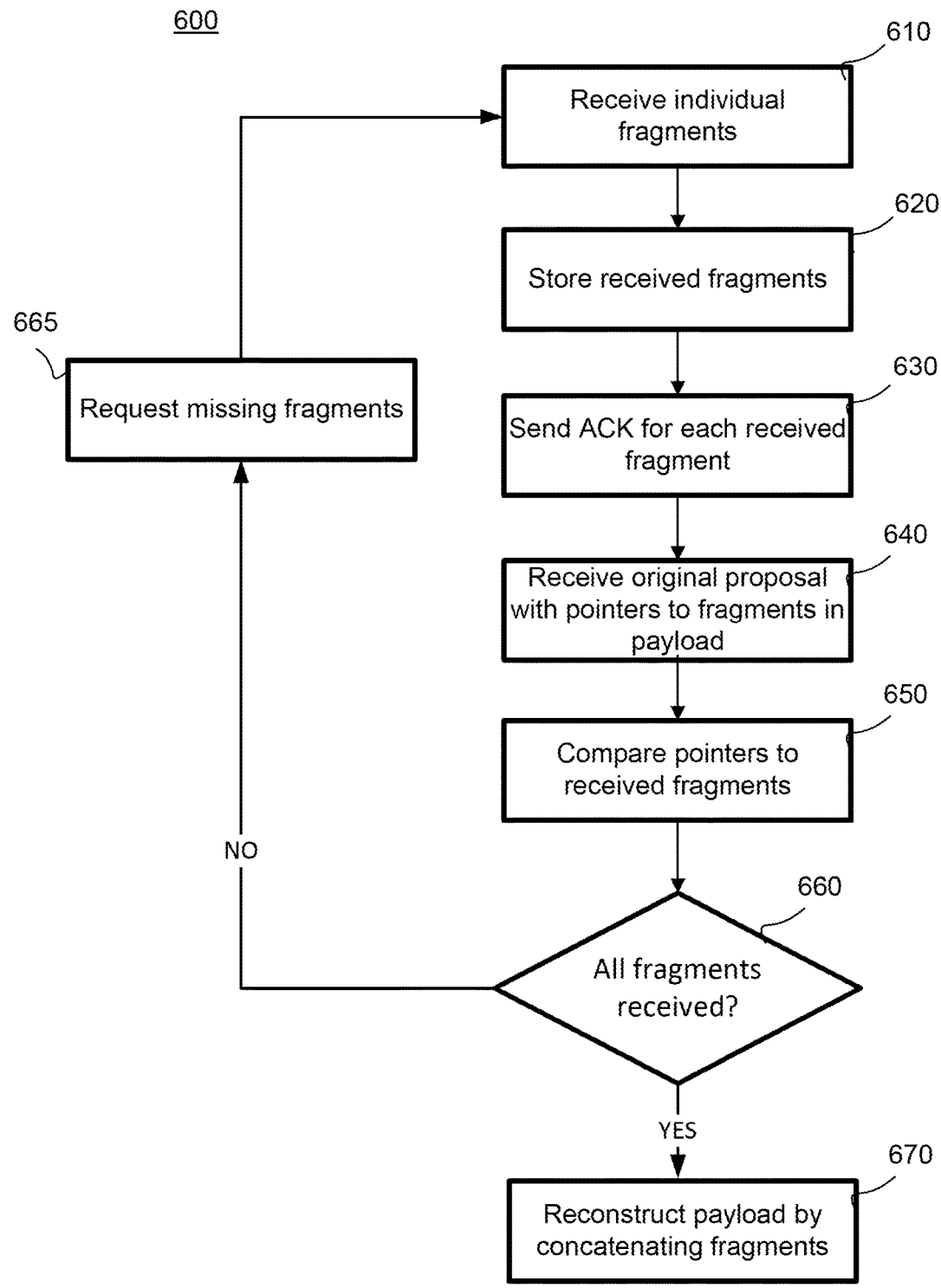
FIG. 6 is another example flow diagram illustrating a method according to aspects of the disclosure.

FIG. 6 illustrates a method 600 of receiving fragments and reconstructing a proposal therefrom. In block 610, a receiver device receives individual fragments, for example, as individual RPCs. The receiver device stores the received fragments (block 620), for example in internal or external memory. For each received fragment, the receiver device sends an acknowledgment (block 630). The acknowledgement may include information identifying the particular fragment received, a time of receipt, a time the acknowledgement was sent, etc.

In block 640, the receiver device receives the original proposal having its payload replaced with references to the fragments. The receiver device may compare the references to the fragments it received and stored (block 650). If it determines (block 660) that one or more fragments referenced in the message were not received, the receiver may take an action, such as requesting the missing fragments (block 665) or requesting to resend the entire proposal. However, if all fragments were received, the received device may reconstruct the original payload in block 670. For example, the sender device may concatenate the fragments based on an ordering indicated in each fragment, in the reference message, or elsewhere.

In some examples, fragments may be redelivered, thus causing duplicate fragments to be received and stored by the received device. Accordingly, the receiver device may identify and discount duplicates based on, for example, the unique identifier and sequence numbers included with each fragment.

While some of the examples above are described with respect to RPCs, it should be understood that other interprocess communication techniques may also be used. For example, user datagram protocol, transmission control protocol, or other types of messages may be used. Further, the examples above are not limited to Paxos, but rather may be implemented in other state machine replication protocols in any of a variety of distributed networking environments.

The above described systems and methods may be advantageous in that in enables large proposals to be sent with increased efficiency. Also, liveness is confirmed by receiving periodic acknowledgements for fragments of proposals. Moreover, using RPCs may be advantageous for a number of reasons. For example, using RPCs allows for attachment of specific information, such as information necessary to maintain leader time leases, to individual fragments. As a further example, by sending each fragment as a separate RPC, it is easier to integrate support for large proposal fragments into code for existing replication protocols such as Paxos, because the RPCs can be treated as any other message. Even further, the systems and methods described above are agnostic to underlying communication primitives layered underneath RPC abstraction.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of sending an original remote procedure call (RPC) having a payload including a proposal for a replicated state machine protocol, the proposal including a unit of data to be written, the method comprising:
   determining whether a size of the payload meets a predetermined threshold;
   splitting, with one or more processors, the proposal into a plurality of Paxos fragments wherein splitting the proposal is based on the size of the payload meeting the predetermined threshold;

sending each of the plurality of Paxos fragments as a separate RPC to a destination device;
receiving an acknowledgement from the destination device for each Paxos fragment received by the destination device;
determining whether the acknowledgement for any Paxos fragment is received within a predetermined time period;
performing an action if the acknowledgement is not received with the predetermined time period;
revising, with the one or more processors, the original RPC, the revising including replacing the payload of the original RPC with a separate reference for each Paxos fragment of the plurality of Paxos fragments sent so that the original RPC can be reconstructed using the one or more references; and
sending, with the one or more processors, the revised RPC to the destination device.

2. The method of claim 1, wherein the action comprises timing out.

3. The method of claim 1, wherein the action comprises canceling the sending of the Paxos fragments and relinquishing responsibility for sending the Paxos fragments.

4. The method of claim 1, wherein sending each of the plurality of Paxos fragments comprises:
sending a first Paxos fragment; and
sending a second Paxos fragment;
wherein sending the second Paxos fragment is independent of receiving an acknowledgement for the first Paxos fragment.

5. The method of claim 1, wherein each of the separate RPC includes a proposal identifier and a sequence number.

6. The method of claim 1, wherein the acknowledgment includes a fragment identifier and a sequence number.

7. A method of receiving a proposal using a replicated state machine protocol, the proposal originally being included in a payload of a remote procedure call (RPC), the method comprising:
receiving, with one or more processors, a plurality of separate RPCs, each of the plurality of separate RPCs including a Paxos fragment of the proposal;
storing the received one or more Paxos fragments;
sending, with the one or more processors, an acknowledgement for each received Paxos fragment;
receiving, with the one or more processors, a revised RPC, the revised RPC being based on the original RPC wherein the payload of the original RPC is replaced with a separate reference for each Paxos fragment of the proposal;
determining, based on the received revised RPC, whether all Paxos fragments of the proposal were received; and
reconstructing, with the one or more processors, the proposal using the references in the revised RPC and the received Paxos fragments.

8. The method of claim 7, wherein determining whether all the Paxos fragments of the revised RPC were received comprises comparing the references in the payload of the revised RPC to the received Paxos fragments.

9. The method of claim 7, further comprising sending a request to a sender computing device if it is determined that one or more Paxos fragments of the proposal were not received.

10. The method of claim 9, wherein the request comprises at least one of:
a request to resend the one or more Paxos fragments determined to be missing; and
a request to resend the entire proposal.

11. The method of claim 10, further comprising:
receiving a redelivery of the plurality of Paxos fragments;
identifying duplicates between the redelivered plurality of Paxos fragments and the Paxos fragments previously received.

12. The method of claim 7, wherein reconstructing the proposal comprises concatenating the received Paxos fragments.

13. The method of claim 7, wherein the references to the Paxos fragments in the payload indicate an order in which the Paxos fragments should be arranged to reconstruct the proposal.

14. The method of claim 7, further comprising:
determining that the revised RPC is received before receiving all the Paxos fragments;
sending a request to retry reconstructing the original RPC at a later time.

15. A system, comprising: a sender computing device, including a memory storing a proposal adapted to be sent in a payload of an original remote procedure call (RPC), and one or more processors in communication with the memory, the sender computing device configured to:
determine whether a size of the payload meets a predetermined threshold
split the proposal into a plurality of Paxos fragments, wherein splitting the proposal is based on the size of the payload meeting the predetermined threshold;
send each of the plurality of Paxos fragments to a receiver computing device as a separate RPC;
receive an acknowledgement from the receiver computing device for each Paxos fragment received by the receiver computing device;
determine whether the acknowledgement for any Paxos fragment is received within a predetermined time period;
perform an action if the acknowledgement is not received with the predetermined time period; and
send a revised RPC to the receiver computing device, the revised RPC being based on the original RPC wherein the payload of the original RPC is replaced with a separate reference for each Paxos fragment of the plurality of Paxos fragments sent so that the original RPC can be reconstructed using the references.

16. The system of claim 15, wherein the receiver computing device comprises a memory and one or more processors in communication with the memory and configured to:
receive one or more separate RPCs including the plurality of Paxos fragments of the proposal;
store the received one or more Paxos fragments;
send the acknowledgement to the sender computing device for each received Paxos fragment;
receive the revised RPC, including the references to each fragment of the proposal, from the sender computing device; and
reconstruct the proposal using the received one or more Paxos fragments.

17. The system of claim 16, wherein the receiver computing device is further configured to determine, based on the revised RPC, whether all Paxos fragments of the proposal were received.

18. The system of claim 16, wherein the receiver computing device is further configured to send a request to the sender computing device if it is determined that one or more Paxos fragments of the proposal were not received, the request comprising at least one of:

a request to resend the one or more Paxos fragments determined to be missing; and a request to resend the entire proposal.

\* \* \* \* \*